(12) United States Patent
Zoldi et al.

(10) Patent No.: US 12,657,489 B2
(45) Date of Patent: Jun. 16, 2026

(54) TEMPORAL EXPLANATIONS OF MACHINE LEARNING MODEL OUTCOMES

(71) Applicant: FAIR ISAAC CORPORATION, Roseville, MN (US)

(72) Inventors: Scott Michael Zoldi, San Diego, CA (US); Shafi Ur Rahman, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 464 days.

(21) Appl. No.: 17/746,802

(22) Filed: May 17, 2022

(65) Prior Publication Data

US 2022/0374744 A1 Nov. 24, 2022

Related U.S. Application Data

(63) Continuation of application No. 16/460,934, filed on Jul. 2, 2019, now Pat. No. 11,373,109.

(51) Int. Cl.
| | |
|---|---|
| *G06Q 40/02* | (2023.01) |
| *G06F 16/23* | (2019.01) |
| *G06F 17/16* | (2006.01) |
| *G06F 21/32* | (2013.01) |
| *G06N 5/045* | (2023.01) |
| *G06N 20/00* | (2019.01) |
| *G06Q 10/06* | (2023.01) |

(52) U.S. Cl.
CPC ............. *G06N 5/045* (2013.01); *G06F 17/16* (2013.01); *G06N 20/00* (2019.01)

(58) Field of Classification Search
CPC ......... G06N 5/045; G06N 20/00; G06F 17/16
See application file for complete search history.

(56) References Cited

U.S. PATENT DOCUMENTS

| | | | | |
|---|---|---|---|---|
| 8,060,456 | B2 * | 11/2011 | Gao | ...................... G06N 20/00 |
| | | | | 706/12 |
| 9,324,323 | B1 * | 4/2016 | Bikel | .................... G10L 15/197 |
| 9,336,770 | B2 * | 5/2016 | Tachioka | .............. G10L 15/063 |
| 10,242,019 | B1 | 3/2019 | Shan et al. | |
| 10,571,539 | B2 * | 2/2020 | Hammer | ........... G06V 10/7715 |
| 10,803,231 | B1 | 10/2020 | Wang et al. | |
| 12,142,027 | B1 * | 11/2024 | Saraee | ................... G06N 3/045 |
| 2016/0364794 | A1 | 12/2016 | Chari et al. | |

(Continued)

*Primary Examiner* — Brandon S Cole
(74) *Attorney, Agent, or Firm* — Mintz, Levin, Cohn, Ferris, Glovsky and Popeo, P.C.; F. Jason Far-hadian, Esq.

(57) ABSTRACT

In transactional systems where past transactions can have impact on the current score of a machine learning based decision model, the transactions that are most responsible for the score and the associated reasons are determined by the transactional system. A system and method identifies such past transactions that maximally impact the current score and allow for a more effective understanding of the scores generated by a model in a transactional system and explanation of specific transactions for automated decisioning, to explain the scores in terms of past transactions. Further an existing instance-based explanation system is used to identify the reasons for the score, and how the identified transactions influence these reasons. A combination of impact on score and impact on reasons determines the most impactful past transaction with respect to the most recent score being explained.

21 Claims, 7 Drawing Sheets

(56)            References Cited

U.S. PATENT DOCUMENTS

| | | |
|---|---|---|
| 2018/0018573 A1* | 1/2018 | Henderson ............... G06N 7/01 |
| 2018/0308018 A1 | 10/2018 | Bansal et al. |
| 2019/0102706 A1* | 4/2019 | Frank ..................... G06N 5/046 |
| 2019/0227902 A1* | 7/2019 | Cheng ................. G06F 11/3608 |
| 2019/0251571 A1 | 8/2019 | O'Reilly et al. |
| 2019/0370250 A1 | 12/2019 | Tipton et al. |

* cited by examiner

TEMPORAL EXPLANATIONS OF MACHINE LEARNING MODEL OUTCOMES

This Application is a continuation of and claims priority to the earlier filing date of U.S. patent application Ser. No. 16/460,934, filed on Jul. 2, 2019, the content of which is hereby incorporated by reference herein in its entirety.

TECHNICAL FIELD

The subject matter described herein relates to machine learning models, and more particularly to a system and method for providing temporal explanations of machine learning model outcomes in transactional systems.

BACKGROUND

Machine learning models are designed to learn decision boundaries based on input data, and they find widespread applications in all types of business use cases. A machine learning model, M, takes an input vector x, and produces a score, y. The input x, is a set of input variables associated with the entity that is being scored by the model, M. The score, y, represents a particular outcome. For example, in payment card fraud detection systems, M could be a neural network model, x could be the values of the various variables associated with a given transaction, and y could be the score representing how likely it is that the transaction is fraudulent.

Often in reality, for transactional systems, the above description is too simplistic and would yield very poor detection of fraud. This is due to the fact that the likelihood of fraud is not only a function of the current transaction, but also (and many times, more importantly) the context in which the transaction happened. This often means evaluating the current transaction in the context of everything else that has transpired on that payment card's account. Thus, the input variables are computed in such a manner that they can reflect the contextual aspect of the transactions. The historical context of impact of past transactions on a current score is critically important to provide human understandable explanations that isolate the past actions. This has become even more important for regulations such as the General Data Protection Regulation (GDPR), in which a human analyst needs to be able to speak to impacted customers of an automated decisioning system, and provide specific events in the pre-history that led to the automated decision. The term "transaction" is used throughout this document to refer to an event associated with an entity that is being evaluated or monitored.

In the above-mentioned use case of fraud detection for payment cards, this context could be provided by using variables that incorporate the information from the past transactions along with the current transaction, to define the input x. Thus, the input may comprise of variables such as, for example: number of transactions in the last 7 days; amount spent in the last one day as a proportion of the average amount spent in the last 30 days; etc. In more advanced systems, such as FICO's Falcon® fraud detection system, more sophisticated techniques including Recursive Bayesian Estimation, time and event decayed averages, and other means are employed to incorporate the historical information in x. The only downside is that this type of "summarization" loses the granularity of the information present in the historical transactions.

The current state of the art for explaining the score, S, generated by a model M, deploys a variety of explanation systems, E, that explain the score, S, as a function of the input components of x. While this works fine in systems where x represents instance features, say an image recognitions system, this doesn't often explain the specific precursors to the score in the transaction history that drove the score outcome. To understand this, consider the above-mentioned use case where a high score indicative of fraud can be attributed to an unusually high value of a variable, say, amount spent in the last one day as a proportion of the average amount spent in the last 30 days. What conventional explanation systems would fail to identify is which of the transactions in the past drove the value of the ratio spend in last day to 30 days to lead to the high fraud score.

Consider another example of a machine learning model driven detection of cyber security breaches. In such a system, a sudden surge in activity on an uncommon port could be the indicative of a breach, and consequent, a high score representing such breach. But the actual reason that the explanation system may focus on could be the volume through that port, instead of recognizing the first opening and use of the port as the core events in the prehistory of merit in terms of investigation and reasons for the outcome. Note that the vector x would be comprised of various input variables, $\{x_1, x_2, x_3, \ldots\}$, which are the input variables, and a set of scalars, bounded by the dimensionality of the vector x.

Accordingly, there is a need for an explanation system that can identify relevant transactions in the past that led to the eventual high score by a transactional analytics system configured to address threats, such as stopping payment card fraud, detecting cyber security threat, credit risk, and identifying money laundering activities, to name a few. There is also a need for such transactional analytics systems to be aware of the past transactions, to isolate the relevant offending past transaction that are the cause of the current high score, and isolate those transactions that drive the main driving predictor variables in x and consequently the score being explained.

SUMMARY

This document describes an explanation system and method that can identify relevant transactions in the past that led to a high score in a transactional analytics system, for analyzing transactions for various purposes, such as stopping payment card fraud, detecting cyber security threat, credit risk, and identifying money laundering activities, to name a few. Such a system and method not only looks at the predictor variables, x, that define the decision model, M. A system and method as disclosed herein is configured to be aware of the past transactions, and can isolate the relevant offending past transaction(s) that is/are the cause of the current high score, and isolate those transactions that drive the important main driving predictor variables in x, and consequently the score being generated and explained.

In one aspect a system and computer program product are disclosed, as well as a method executed by the system and computer program product. The method includes the steps of receiving transactional data of an entity over a period of time, the transactional data representing a plurality of transactions of the entity. The method further includes deriving an input vector from the plurality of transactions. The method further includes generating, by a scoring model of the transactional analytics system, a score based on the input vector derived from the plurality of transactions, the scoring module model generating the score based on the transactional data as an input. The method further includes generating, by an explanation model of the transactional analytics system, a weighted reason vector and associated top ranked reasons based on the input vector derived from the plurality of transactions, the weighted reason vector and top ranked reasons providing a set of top contributor variables in the input vector and latent features of the scoring model that explain the score.

The method further includes using the scoring model, recursively omitting selected transactions of the plurality of transactions from the input to determine a maximal effect of at least one of the plurality of transactions on the score, the weighted reason vector, and/or the associated top ranked reasons. The method further includes generating, based on the omission of at least one of the plurality of transactions having the maximal effect on the score, the weighted reason vector, and/or associated top ranked reason, an importance measure that is a function of a change in the score and a change in the weighted reason vector and/or the top ranked reasons. The method further includes using an importance measure and based on the at least one of the plurality of transactions, determining the at least one of the plurality of transactions that has the maximal importance measure. The method further includes outputting the at least one of a plurality of transactions in an output file to a computer to enable review of the temporal events and transactions most responsible for the entity's current score and reason vector and/or top ranked reasons.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a system and method for providing temporal explanations of machine learning model outcomes in transactional systems, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
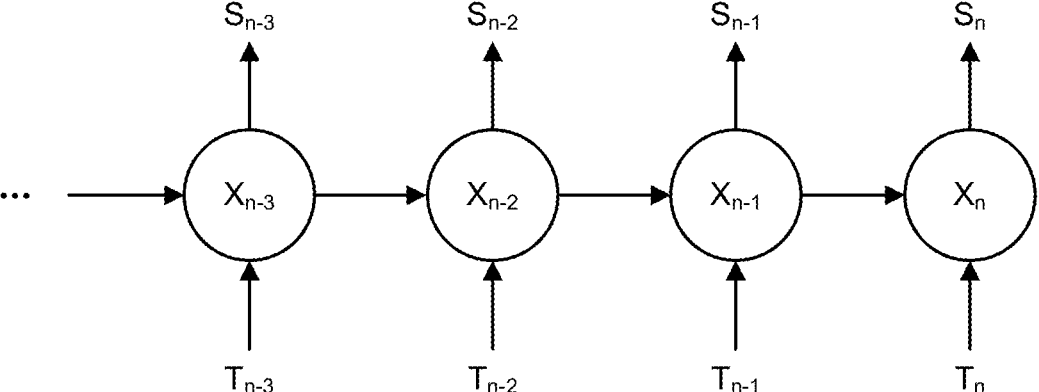
FIG. 1 shows a series of scores of an entity in a transaction analytics system, where the profile or state variables are impacted by current as well as past transactions.

This document describes an explanation system and method that is designed to identify relevant past transactions that led to a high score in a transactional analytics system for analyzing transactions for various purposes, such as stopping payment card fraud, detecting cyber security threat, credit risk, and identifying money laundering activities, to name a few. Such a system is designed to not only look at the predictor variables, x, that define the decision model, M, but to also be aware of the past transactions, and can isolate the relevant offending past transaction that is the cause of the current high score, and isolate those past transactions that drive the important main driving predictor variables in x, and consequently the score being explained.

In some implementations, a transactional analytics system and method is designed to analyze a number of past transactions that contribute to a score generated by a model M, and identify a past transaction that is most responsible for the current high score of the model, M. In doing so, the system and method can also leverage any instance based explanation system to provide the drivers of the score. Furthermore, the system and method can also quantify impact of each of the past transactions on such instance based explanation system, along with their impact on the scores. Accordingly, the system and method disclosed herein implement a sophisticated methodology and framework that can isolate the impact of each of the past N transactions on a current score generated by an arbitrary model, M. It is worth noting that in a transactional analytics system, each past transaction impacts the values of the current input variables, x, in complex ways that are not discernable by a human, in the mind or using pen and paper. With so many scores, and infinitely greater number of transactions that support the scores, the present system and method can only be executed by a computer. As part of determining the impact of the past transaction on the current score, the relationship between the past transaction and the current values of the input variables, x, must also be reproduced in the analysis.

The temporality of the explanation is reflected by the system being designed to determine which of the past transactions maximally influence the current score. Such a determination can be made based on each individual transaction, or as an aggregate of multiple transactions. Each past event or transaction impacts the values of the input variables, x, in an intricate manner, defined by the variable transformation function, F, that computes and updates the input variables, x, as new transactions unfold. The impact of a particular transaction T is assessed by measuring the change in the values of x, when the said transaction T is missing. This allows us to accurately quantify the impact of the transaction T on the current value of input variables, say, x'. If the modified value of x' is then scored using the model M, the score S' that it produces could differ from the original score S, as can the driving model reasons. The quantum of change in the score (S–S') is the impact of the transaction T on the score S. Such 'what if' analysis of historical transactions is important in order to provide human understandable explanations that isolate the past actions and their impact on the score. This is important for regulation such as GDPR where a human analyst needs to be able to speak to impacted customers of an automated decisioning system and provide specific events in the pre-history that lead to the automated decision.

More than one past transaction can be the reason for the current score, and can be used to explain the score S. Thus, more than one temporal value can be identified as the driver of the explanation. Accordingly, a system and method can include a mechanism for arbitration based on the quantum of change in the score (S–S'). As a quantum of change in a score is measured, (S–S'), the changes in the reasons of S' as described by the instance based explanation system, E are recorded. For example if two different past transaction removals yield the same score difference, yet a first transaction does not have any change in one or more of the original reasons whereas a second one does, then the two past transactions are considered to have a different impact on S, irrespective of the identical quantum of change in the score, S–S'. The identified transactions provide additional narrative to the explanations from the instance based explanation system, E, already in use in transactional analytic systems, and allows these systems to meet a standard set by regulation where specific human understandable explanations are necessary for automated decision systems.

In some implementations, for instance, such as in a case of detecting money laundering, if the identified transaction represents a large deposit 4 days ago, and the explanation model, E, identifies the variables, amount transferred out of the account in the last one day and amount deposited into the account in the last one week, both as top explanations, then an understanding of why the account has been flagged as a potential money laundering case in terms of the specific driving transaction or transactions can facilitate the correct event-based explanations. Further, if the explanation associated with the modified score S' changes to merely amount transferred out of the account in the last one day, it provides additional details about the reason for score S. Thus, not only the change in the score points to the impact of the past transaction on the current score, but the change in the reasons from the instance based explanation system, E, provides additional insight into the nature of the impact.

Machine Learning Models for Transactional Analytics

A machine learning model is trained by presenting a training dataset to a learning algorithm. In cases where it is learning based on supervised information, it learns relationships between the predictor variables, x and the outcome variable, t, and encapsulates them as learnt model parameters, $\theta$. Thus, an arbitrary model, M, is represented by an underlying function, $\eta$, driven by the machine learning model's architecture, and the learnt model parameters, $\theta$.

$$M(x)=\eta(x,\theta) \tag{1}$$

where,

M: an arbitrary machine learning model x: an input instance represented as a vector comprising of the constituent variables $\theta$: learnt parameters of the model based on historical data $\eta$: a function representing the machine learning model's underlying architecture Such a model, M, generates a score, S as a function of an instance of input variables, x. This can be represented as follows:

$$S=M(x) \tag{2.a}$$

where,

S: score generated by the model, M for the instance of the input, x.

Often, an instance based explanation system, or model, E, is used to identify the constituent variables of the input vector, x, or their groupings, latent features, or a set of reasons, $\{r_1, r_2, r_3, \ldots\}$, distinct from the input variables or latent features, that explain the score, S. Without loss of generality, we will use the notation of $\{r_1, r_2, r_3, \ldots\}$ when talking of reasons, even when we are using the individual or groupings of input variables $\{x_1, x_2, x_3, \ldots, x_N\}$ or associated latent features as reasons. Such systems also provide a rank ordering of the importance of each of the reasons in terms of their explanation of the score. This can be represented as follows:

$$R=E(x,S) \tag{2.b}$$

R is an ordered set of reasons $\{r_p, r_q, r_r, \ldots\}$ generated by the explanation system, or model, E, that explains the score S, of the input instance, x. Reason $r_p$ has a rank of 1, reason $r_q$ has a rank of 2 and so on. Often only a subset of top m reasons with the highest ranks are reported. An "energy" associated with each reason is dependent on the nature of the explanation system, E, and the internal mechanism using which each reason can be generated:

$$L=L(x,S,E)=\{l_p,l_q,l_r \ldots\} \tag{2.c}$$

where, $l_p$ is energy associated with $r_p$, and so on. The rank ordering of the reasons is based on the values of $l_p$, $l_q$, $l_r$, ..., with $l_p > l_q > l_r > \ldots$ and so on.

Where transactional analytics differ from other types of analytics is the nature of the input variable vector x. Many non-transactional analytics systems consider past events, but only by pre-processing past transactions into event summarization. The systems and methods described herein deal with transaction streams, as opposed to event summarization. Where event summarization is employed, analysis similar to that described below would have to be constructed based on versions of the event summary, such as missing only two payments versus three payments in the last 12 months. It is worth noting that in transactional systems, the input vector is a function of not only the current transaction, $T_n$, but all the past transactions, $T_1, T_2, \ldots, T_{n-3}, T_{n-2}, T_n$, as well, where the subscripts represent the enumeration of the transactions, or events, of the entity being analyzed. Thus, a series of transactions for an entity, $T_1, T_2, \ldots, T_{n-3}, T_{n-2}, T_{n-1}, T_n$, are recorded, with $T_n$ being the most current transaction. This is distinct from non-transactional systems, where the system gets to see only event summarization but not the actual transactions, where once again retro or 'what-if-analysis' would be need to be done on events that lead to specific important event summarization variables driving reasons.

FIG. 1. illustrates a series of scores of an entity in a transaction analytics system, where the profile or state variables are impacted by current as well as past transactions. The corresponding states that fully describe the entity are represented by a sequence of instance vectors, $x_1, x_2, \ldots x_{n-3}, x_{n-2}, x_{n-1}, x_n$. The state is often referred to as profile in a transaction analytics system. A profile vector is a multidimensional representation of the entity's state, and each of its dimension is called a state variables or profile variable and are functions of the prior state and current transaction:

$$x_n = F(x_{n-1}, T_n) \tag{3.a}$$

Equation 3.a is equivalent to considering some or all of the prior transactions using an alternative but computationally equivalent transformation function, F':

$$x_n = F'(T_n, T_{n-1}, T_{n-2}, \ldots) \tag{3.b}$$

While using either of the two approaches, 3.a or 3.b, the value of $x_n$ is impacted if one or more of the past transactions are missing. In some implementations, the recursive version F in equation 3.a can be used as a reference method for profile computation and update.

If a machine learning model is used to predict an outcome, such as a likelihood of a transaction $T_n$ of an entity being fraudulent, the relationship is manifested in terms of the entity's current state. In all such models, the score, $S_n$, generated by a machine learning model, M, is represented as follows:

$$S_n = M(x_n) \tag{4.a}$$

and the scores are explained by a set of reasons, $R_n$. Consider the instance based explanation system, E, being used to explain the drivers of a score instance. Let $R_n = \{r_{np}, r_{nq}, r_{nr}, \ldots\}$ be a set of reasons identified by the explanation system as the reasons for the score. Let, $\{r_{np}, r_{nq}, r_{nr}, \ldots\} \in \{r_1, r_2, r_3, \ldots\}$, a superset of reasons identified or learned during the training or creation of the instance based explanation system, or model, E. In an alternative implementation, $\{r_{np}, r_{nq}, r_{nr}, \ldots\} \in \{x_1, x_2, x_3, \ldots, x_m\}$ i.e., they could be the scalar components of the input vector x. In yet other alternative implementations, grouping of input variables and latent features can be used in lieu of individual variables as explanations. In such cases, $\{r_p, r_q, r_r, \ldots\}$ represent set of input variable groups and equations of features instead of literal input variables. Without loss of generality, the notation of $\{r_1, r_2, r_3, \ldots\}$ is used herein when describing reasons, even when the individual input variables or their groupings or latent features are used as reasons.

Thus:

$$R_n = E(x_n, M(x_n)) = \{r_{np}, r_{nq}, r_{nr}, \ldots\} \tag{4.b}$$

where, M represents the learnt relationship in the context of the specific machine learning architecture and the learnt model parameters or weights based on the historical training data. The corresponding energy associated with the reasons are given by:

$$L_n = L(x_n, M(x_n), E) = \{l_{np}, l_{nq}, l_{nr}, \ldots\} \tag{4.c}$$

where, $l_{np} > l_{nq} > l_{nr} > \ldots$

Note that these are the transactional analytics equivalent of the equations (2.a), (2.b) and (2.c) respectively. The benefit of the above equations is that a scoring system does not have to have access to the entire transaction history to be able to provide a meaningful score $S_n$ as it utilizes the state updated at $T_n$.

Temporal Score Explanations For Machine Learning Models

Figure 2:
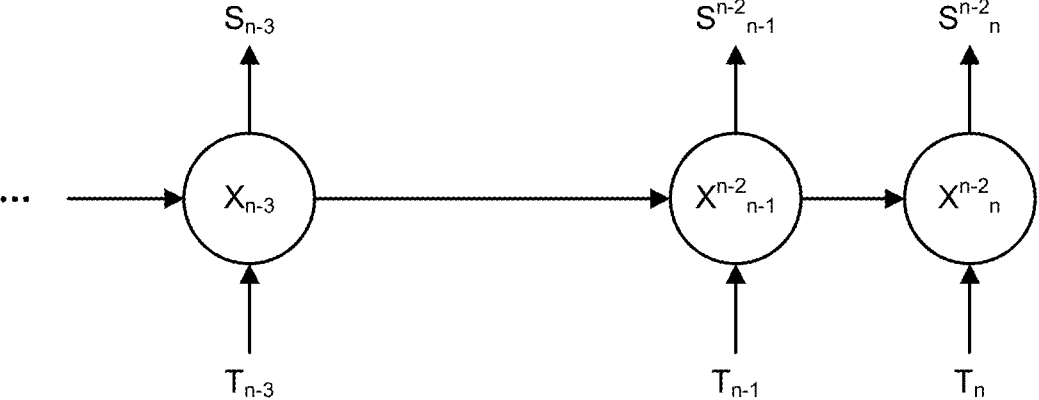
FIG. 2 shows a series of scores of an entity in a transaction analytics system, showing the impact of removing a past transaction, Tn−2 on the subsequent profile variables.

The importance of each of the past transactions, $T_k$, is assessed for the current score, $S_n$, where, $k = (n-1, n-2, \ldots)$. This goal is achieved by using the counterfactual scenario of the same sequence of transactions, but with $T_k$ missing. Such a sequence would look like $T_1, T_2, \ldots, T_{k-1}, T_{k+1}, \ldots, T_{n-1}, T_n$. The effect of the missing transaction, $T_k$, is felt on each of the subsequent states, due to (3.a) and (3.b). Thus, the subsequent states or profiles would change from $x_{k+1}, x_{k+2}, \ldots, x_{n-1}, x_n$ to $x^k_{k+1}, x^k_{k+2}, \ldots, x^k_{n-1}, x^k_n$ respectively, due to equations (3). The superscript of k indicates that the $k^{th}$ transaction has been eliminated. It follows from (4) that the subsequent scores would also change from $S_{k+1}, S_{k+2}, \ldots, S_{n-1}, S_n$ to $S^k_{k+1}, S^k_{k+2}, \ldots, S^k_{n-1}, S^k_n$ respectively. FIG. 2 illustrates a series of scores of an entity in a transaction analytics system, showing the impact of removing a past transaction, Tn−2 on the subsequent profile variables. In FIG. 2, the $T_{n-2}$ transaction is represented as missing and hence n−2 is the superscript in subsequent transactions representing the missing transaction for the impacted states and scores.

Thus, the contribution of a transaction, $T_k$, can be assessed on a particular score, $S_n$, by measuring the quantum of change in the score, when that transaction, $T_k$, is missing. This change also affects the set of reasons associated with the modified input vector, $x^k_n$, and the modified score, $S^k_n$, where:

$$S^k_n = M(x^k_n) \tag{5.a}$$

The impact of the transactions, $T_k$, on the reasons as explained by explanation system, E, can be identified by this mechanism as well. Accordingly, a new set of explanations corresponding to each impactful transaction, $T_k$, can be generated as follows:

$$R^k_n = \{r^k_p, r^k_q, r^k_r, \ldots\} \leftarrow E(x^k_n, M(x^k_n)) \tag{5.b}$$

The corresponding energy associated with the reasons are given by:

$$L^k_n = L(x^k_n, M(x^k_n), E) = \{l^k_{np}, l^k_{nq}, l^k_{nr}, \ldots\} \tag{5.c}$$

where, $l^k_{np} > l^k_{nq} > l^k_{nr} > \ldots$

Thus, an importance measure, $I_{k,n}$, quantifying the contribution of a transaction, $T_k$, on a particular score, $S_n$, and set of reasons $R_k$ can be identified as follows:

$$I_{k,n} = Q(\Delta S_{k,n}, O_{k,n}, P_{k,n}) \tag{5.d}$$

where, k<n, $$x^k_n = F(x_{n-1}, T_n),$$

where $T_k$ is missing $$\Delta S_{k,n} = S_n - S^k_n$$

$$O_{k,n} = O(R_n, R^k_n)$$

$$P_{k,n} = P(R_n, R^k_n)$$

where:

O is a function to quantify the impact of the change in energy of reason codes due to the absence of the transaction $T_k$, P is a function to quantify the impact of the change in rank order of reason codes due to the absence of the transaction $T_k$, and Q is a function to quantify the cumulative impact of change in score and change in reason codes due to the absence of the transaction $T_k$.

Thus, the top-most influential transaction, $T_{k'}$, impacting the current score $S_n$, is given by:

$$T_{k'} = \text{top\_transaction}(S_n) = \text{argmax}_k(I_{k,n}) \quad (6.\text{a})$$

where contributions to $I_{k',n}$ are:

$\Delta S_{k',n}$ $O(R_n, R^{k'}_n)$ $$P(R_n, R^{k'}_n)\} \quad (6.\text{b})$$

Comparing $R^{k'}_n$ with $R_n$ along with the change in score, $\Delta S_{k',n}$, provides insights into the nature of influence of $T_{k'}$ on $S_n$. By carefully choosing the nature of functions O, P and Q, the influence score, $I_{k',n}$, provides a mechanism for arbitration between two values of k' where, the respective $R^k_n$ may demonstrate different degrees of change with respect to $R_n$ even though the corresponding scores, $S^{k'}_n$ are same, or vice versa. These are described more fully below.

Three distinct scenarios arise for $S_n - S^k_n$: 1) The value remains range bound. This means that there is not much difference in $S_n - S^k_n$, and indicates that the transaction $T_k$ has minimal impact on the score $S_n$; 2) The value is positive and reasonably large. This means that the absence of the transaction $T_k$ leads to reduction in score, $S_n$, indicative of influence on the score $S_n$; and 3) The value is negative. This means that the absence of the transaction $T_k$ leads to increase in score, $S_n$. To understand this, consider the case of fraud detection on a payment card, such as a debit card, credit card, or the like. If a high score indicates higher likelihood of fraud, then in such a scenario, $T_k$ represents a very normal behavior on the card in the presence of other fraudulent transactions. Hence, its presence could depress the score, however its absence makes the offending transactions look even more suspicious and therefore a higher score, $S^k_n$.

Figure 3:
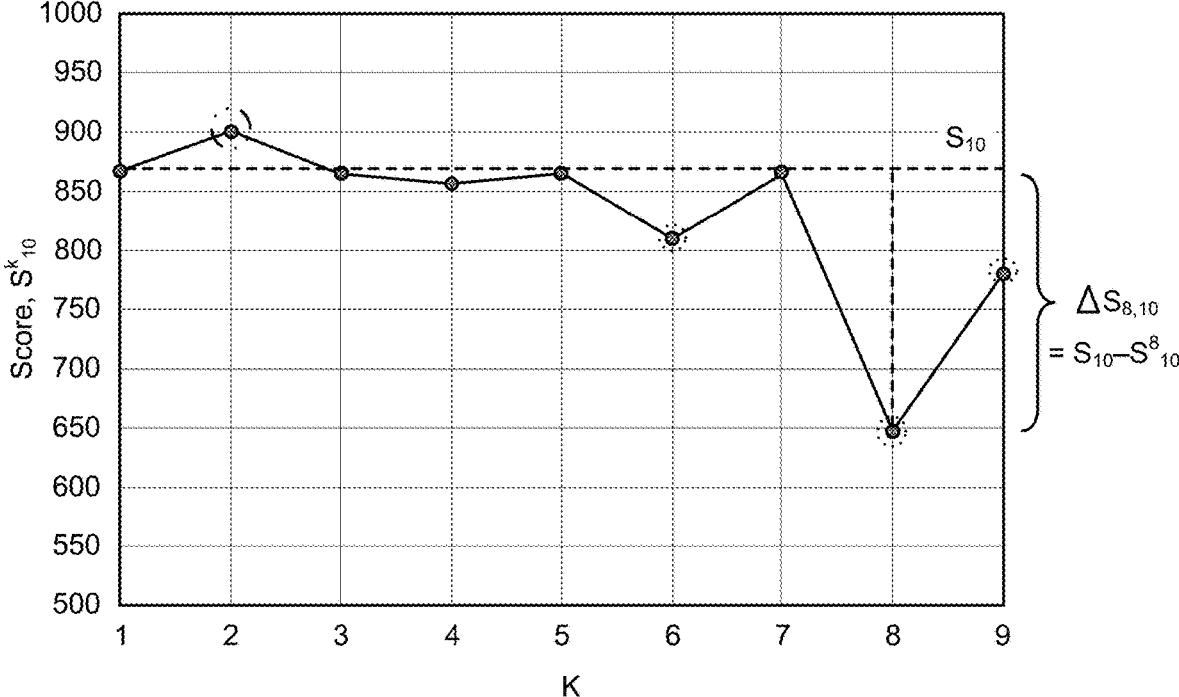
FIG. 3 illustrates an impact of each transaction, k, on score, $S_{10}$, is measured by quantifying the score, $S^k_{10}$ as a result on eliminating the $k^{th}$ transaction.

FIG. 3 shows three types of transactions in terms of their impact on the score $S_n$. FIG. 3 illustrates the impact of each transaction, k, on score, $S_{10}$, which is measured by quantifying the score, $S^k_{10}$ as a result on eliminating the $k^{th}$ transaction. Note that as per 5, k<10. Score, $S_{10}$ is shown as a dotted horizontal line, and $\Delta S_{8,10} = S_{10} - S^8_{10}$, the impact of the $8^{th}$ transaction, $T_8$, on score $S_{10}$ as a dotted vertical line. The impact is largely positive for transactions, 6, 8 and 9, as shown by smaller circles. The impact is negative for transaction 2, shown by larger circle. The impact remains range bound for the other transactions.

Comparing $\{r_p, r_q, r_r, \ldots\}$ against $\{r^k_p, r^k_q, r^k_r, \ldots\}$ corresponding to each of the identified impactful transactions, $T_{k'}$ provides additional insight into the reasons behind the score $S_n$. This is a critical, as the impact of top most influential transactions, $T_k$, on the score $S_n$, is not only due to the quantum of the influence on the score, $S^k_n$, but also on the impact of the reasons from the instance based explanation system itself. This also comes in handy to quantify the impact on reasons, when the impact of two different transactions, $T_{k'}$ and $T_{k''}$, on the overall score $S_n$ need to be compared in terms of how they impact the reasons. The importance measure, $I^k_n$, described in equation (6) thus not only incorporates the impact on the score itself, but also on the nature of impact on the score in terms of influence on the reason codes.

In some implementations, to quantify the impact of the change in energy of reason codes due to the absence of the transaction $T_k$, $O_{k,n}$ via function O, the energy associated with each reason code for $R_n$ and the their energies for $R^k_n$ is determined. Then, the change in energy of each of the reasons in $R^k_n$, is measured, and this change is represented as a vector, whose length provides us a quantification of the change. The function O can usually be defined as follows:

$$O_{k,n} = O(R_n, R^k_n) = \|L^k_n - L_n\|_2$$

$$O_{k,n} = O(R_n, R^k_n) = \|l^k_{np} - l_{np}, l^k_{nq} - l_{nq}, l^k_{nr} - l_{nr}, \ldots\|_2 \quad (6.\text{c})$$

which is the $L_2$ norm of the delta vector $L^k_n - L_n$ with rank ordering on $L^k_n$. Rank ordering on $L^k_n$ means that $l^k_{np} > l^k_{nq}$ and $l^k_{nq} > l^k_{nr}$ and so on. The indices p, q, r etc. denote specific reasons. Thus, $l^k_{np} - l_{np}$ represent change in the energy of reason $r_p$ associated with $R^k_n$ and $R_n$, and so on.

In alternative implementations, the maximum change in energy of any of the reasons can be determined and examined. This is defined as follows:

$$O_{k,n} = O(R_n, R^k_n) = \max(l^k_{np} - l_{np}, l^k_{nq} - l_{nq}, l^k_{nr} - l_{nr}, \ldots) \quad (6.\text{d})$$

If only the top few reasons are reported, then the change in energy of only the reported reasons in $R^k_n$ are considered. For example, if only top 3 reasons are reported with the top three reasons being $r^k_{np}$, $r^k_{nq}$ and $r^k_{nr}$, then equation (6.c) gives way to the following:

$$O_{k,n} = O(R_n, R^k_n) = \|l^k_{np} - l_{np}, l^k_{nq} - l_{nq}, l^k_{nr} - l_{nr}\|_2 \quad (6.\text{e})$$

Similarly, in such a scenario, equation (6.d) gives way to the following:

$$O_{k,n} = O(R_n, R^k_n) = \max(l^k_{np} - l_{np}, l^k_{nq} - l_{nq}, l^k_{nr} - l_{nr}) \quad (6.\text{f})$$

Figure 4:
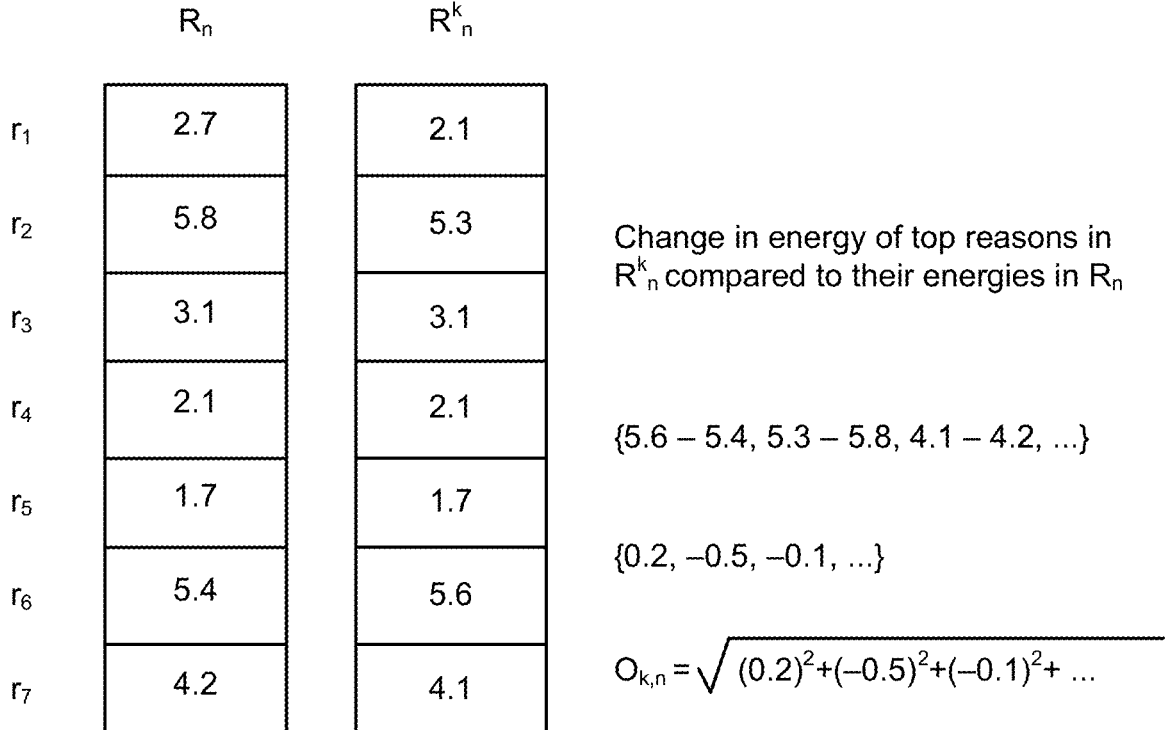
FIG. 4 illustrates a computation of change in energy of the reasons $R^k_n$ after elimination of transaction $T_k$ with respect to reference set of reasons with all the transactions, $R_n$, such that if only top N reasons are reported then the delta vector is represented for the top reasons in $R^k_n$ only.

FIG. 4 shows the computation of change in energies, O, as an illustrative example. FIG. 4 illustrates a computation of change in energy of the reasons $R^k_n$ after elimination of transaction $T_k$ with respect to reference set of reasons with all the transactions, $R_n$. If only top N reasons are reported, then the delta vector is represented for the top reasons in $R^k_n$ only.

In some implementations, to quantify the impact of the change in rank order of reason codes due to the absence of the transaction $T_k$ via function P, a simple heuristic is used to determine the impact of transaction $T_k$ on the rank order of the reasons, by way of reason impact point, $P_{k,n}$, quantifying the measure of difference between $R^k_n$ and $R_n$:

1. $P_{k,n} = 0$
2. Let L=number of reasons=$|R^k_n| = |R_n|$
3. For each $r^k$ in $R^k_n$, that is not in $R_n$
   a. Update $P_{k,n} = P_{k,n} + (L - \text{rank} + 1)$, where rank of $r^k$ is its position in the ordered set $R^k_n$
4. For each $r^k$ in $R^k_n$, that is also in $R_n$
   a. Assign $|\text{rank}^k_n - \text{rank}_n|$ points, where $\text{rank}^k_n$ of $r^k$ is its position in the ordered set $R^k_n$ and $\text{rank}_n$ is its position in the ordered set $R_n$
   b. Update $P_{k,n}$ by
5. Report $P_{k,n}$ Comparing $P_{k,n}$ for two transactions $T_{k'}$ and $T_{k''}$ also allows to understand the impact on the reasons by way of points calculated above, $P_{k',n}$ and $P_{k'',n}$. Other ways for determining the quantum of impact on reasons can be implemented as well. Thus, the above heuristic can be used to define $P(R_n, R^k_n)$ in equation 6 as follows:

$$P(R_n,R^k_n)=P_{k,n} \quad (6.g)$$

With this equation, an impact of two important transactions, $T_{k'}$ and $T_{k''}$ can be ascertained by comparing their importance measure, $I_{k',n}$ and $I_{k'',n}$. Alternative implementations of $I_{k,n}$ are possible. Top transactions and associated reasons can be identified by rank ordering $I_{k,n}$ and identifying the corresponding transactions, as in equation (6.a). It should be noted that irrespective of the quantum of impact of the prior transactions on the score, they may have significant impact on the reasons, $R^k_n$ as well.

Figure 5:
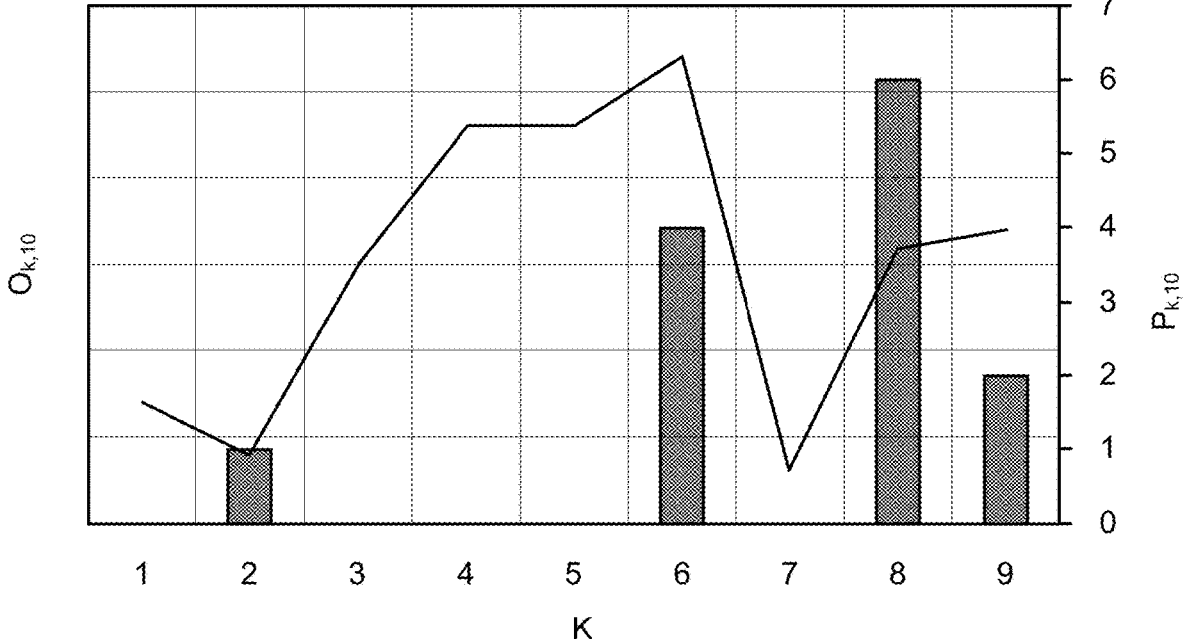
FIG. 5 illustrates an impact of each transaction, k, on score, $S_{10}$, and reason codes $R_{10}$ being measured as a change in energy $O_{k,10}$ as well as change in rank order $P_{k,10}$ as a result on eliminating the $k^{th}$ transaction.

This nuanced aspect of the impact of a prior transaction on current score is shown in FIG. 5, which illustrates that an impact of each transaction, k, on score, $S_{10}$, and reason codes $R_{10}$ is measured as change in energy $O_{k,10}$ as well as change in rank order $P_{k,10}$ as a result on eliminating the $k^{th}$ transaction. For transactions 1, 3, 4, 5 and 7 we notice change in energy of the reasons without any change in the rank ordering of the rank ordering. Note also that lower change in energy may be associated with higher change in rank order and vice versa. Hence it is important to consider both along with the quantum of change in score to determine the most impactful transaction, $T_{k'}$.

The importance measure, $I_{k,n}$ can be decomposed into the score impact, $S_n - S^k_n$, and the reason impact, $P_{k,n}$. This decomposition provides us a richness in explanation. While $I_{k,n}$ is used for rank ordering on transactions to determine the most impactful transactions, the impact on the score, $S_n - S^k_n$, and reason impact $P_{k,n}$ aid in understanding the nuanced difference when $I_{k',n}$ and $I_{k'',n}$ are equal for transactions, $T_{k'}$ and $T_{k''}$. In some cases though, where the focus is on determining the impact on the reasons more than on the score itself, $P_{k,n}$ can act as the primary metric for rank ordering to determine the most impactful transactions. The nature of the function Q, often derives from the nuances of explanations expected in a particular system.

In some preferred exemplary implementations, a replay method can be used. In a replay method, the model, M is used, and the available transactions to explain the current score, $S_n$ are used. One transaction $T_k$ is dropped at a time, to process the remaining transactions in the same sequence as original, through F, to generate the profile $x^k_n$, and generate the score $S^k n$.

From an implementation perspective, a pre-history of transactions is retained, and past state profiles requires storage and computational time that is linear in terms of the number of transactions. For automated decisioning systems, the analysis of the offending transactions responsible for driving the reasons are computed at time of investigation by human-analyst or an automated communication system.

The impactful transactions need to be identified at the time of case generation and customer dialogue in the case management phase, and not in terms of any streaming real-time score production. As such, generation of the transactions driving explanation should not slow down real-time scoring systems, and only a small fraction of accounts may need such detailed causal transaction analysis. Thus, the computational requirements of the causal transaction explanation analysis do not impact the production use of the transactional analytics system, but operate post score-generation in a case management environment or automated customer communication system where explanations are generated. Further, given the often-decreasing value of older transactions in explanation, the following restrictions can be applied to the value of k in (5.a) to restrict the number of past transactions that are identified as having impact on the current score, $S_n$:

$$n-N \leq k < n \quad (7)$$

where, N is a system parameter determined during the time of the system design.

Figure 6:
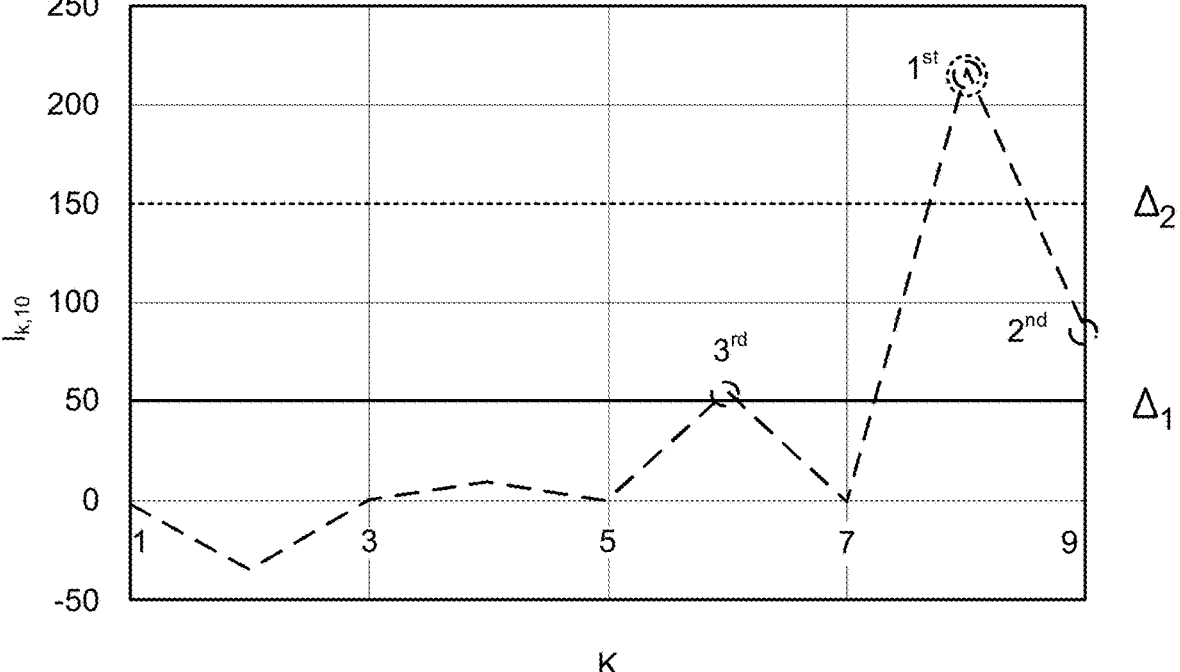
FIG. 6 illustrates an impact of each transaction, k, on score, $S_{10}$, and reasons $R_{10}$, being measured by $I_{k,10}$ as a result on eliminating the $k^{th}$ transaction.

Further restrictions can be applied based on the value of $I_{k,n}$. In one approach, a threshold $\Delta$ is applied, on $I_{k,n}$. $\Delta$ can be absolute or relative. FIG. 6 shows the most influential past transactions, rank ordered on the $I_{k,n}$ under two different thresholds. An impact of each transaction, k, on score, $S_{10}$, and reasons $R_{10}$, is measured by $I_{k,10}$ as a result of eliminating the $k^{th}$ transaction. When a threshold of $\Delta 1$ is applied, then 3 transactions are identified as impactful on score $S_{10}$. They are $8^{th}$, $9^{th}$ and $6^{th}$ transactions respectively, in that order, marked by circles. On the other hand, when a threshold of $\Delta 2$ is applied then only the $8^{th}$ transaction is identified as impactful, which is marked with two circles. Note that transaction number 2 has an impact which is not considered as per equation (5). Just as in case of FIG. 4, the reason impact, $P_{k,n}$ can be used to further understand the nature of impact.

Note that as per equation (3.a), the last profile value and the last transaction are required to compute the current profile variable. Consider the sequence of transactions, $T_{n-N}, T_{n-N+1}, \ldots, T_{k+1}, T_{k-1}, \ldots, T_{n-1}, T_n$ with $T_k$ missing, where $n-N \leq k < n$. The equation (3.a) can be leveraged in an iterative fashion for computing $x^k n$ as follows:

$$x_{n-N} = F(x_{n-N-1}, T_{n-N})$$

$$x_{n-N+1} = F(x_{n-N}, T_{n-N+1})$$

$$x_{k-1} = F(x_{k-2}, T_{k-1})$$

$$x^k_{k+1} = F(x_{k-1}, T_{k+1})$$

$$x^k_{n-1} = F(x^k_{n-2}, T_{n-1})$$

$$x^k_n = F(x^k_{n-1}, T_n) \quad (8)$$

Figure 7:
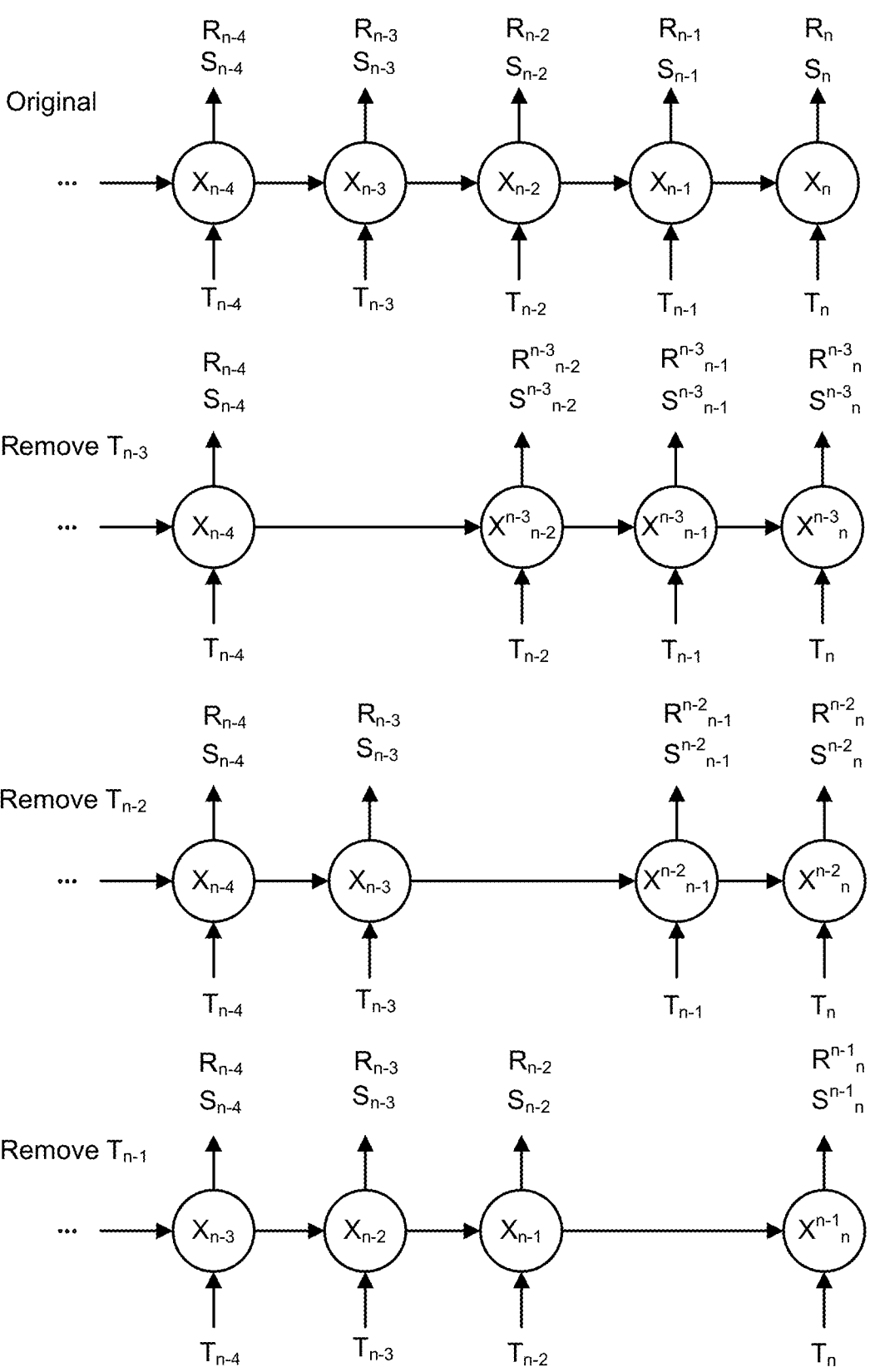
FIG. 7 is a schematic representation of computations required to determine the impact of the last 3 transactions, N=3, on the most recent score and reasons, where the last 3 transactions, $T_{n-1}$, $Tn_{n-2}$, $T_{n-3}$, along with the current transaction, $T_n$, and the $4^{th}$ past profile, $x_{n-4}$ are used, such that recursively each of the last 3 transactions are dropped to compute the impacted current profile variable and the corresponding score.

The set of equations (8) provide an easy way to compute the value of $x^k_n$. Then, using equation set (5), $S^k_n$, $R^k_n$ and $I_{k,n}$ are computed. Note that $x_n$, $S_n$ and $R_n$ have to be persisted from the production as well. Using equation set (8), the past N transactions, $T_{n-N}, T_{n-N+1}, \ldots, T_{n+2}, T_{n-n}$ are retained, as well as the current transaction, $T_n$ in a database, such as a NoSQL database. The profile value prior to the transaction $T_{n-N}$ is also retained, that is $x_{n-N-1}$ in the NoSQL database. Implicit here is the need to compute $O_{k,n}$ and $P_{k,n}$ based on $R_n$ and $R^k_n$ to determine the value of $I_{k,n}$. Based on $I_{k,n}$ the transactions, $T_k$ are identified that are most impactful based on equation set (6). FIG. 7 below shows a schematic of the computation required to quantify the impact of each of the past transactions, where N=3.

FIG. 7. is a schematic representation of computations required to determine the impact of the last 3 transactions, N=3, on the most recent score and associated reason(s). Using the last three transactions, $T_{n-1}, T_{n-2}, T_{n-3}$, along with the current transaction, $T_n$, and the $4^{th}$ past profile, $x_{n-4}$, recursively each of the last 3 transactions are dropped to compute the impacted current profile variable and the corresponding score. Corresponding reason codes for the current impacted score are also generated using the instance based explanation system. This in conjunction with the current transaction and the reasons for the current (unimpacted) score provide a comprehensive picture of what's driving the score in a transactional analytics system. $I_{k,n}$ is used for determining the most impactful transactions. In each iteration, only $x_{n-4}$ along with the subsequent transactions, excluding the dropped transactions, are required to compute the updated $x^k_n$, $S^k_n$ and $R^k_n$.

As the transactions unfold, the persisted transactions and past input vector that have been stored in the NoSQL database need to be updated. In some implementations, this is managed by storing the transactions in a queue data structure, TS, and flushing out the oldest transaction when adding the most recent one. Simultaneously, the persisted input vector is updated by a more recent copy of the input vector.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented machine learning system for managing abnormal transactions in a communications network, the system comprising:

one or more data storage media devices communicatively coupled to the communications network, the one or more data storage media devices storing entity data communicated over the communications network;

a first computing system communicatively coupled to the communications network, the first computing system collecting the entity data and determining an input vector based on a plurality of transactions associated with the entity data, wherein the plurality of transactions include one or more abnormal transactions involving potentially fraudulent or malicious activity;

a first analytic model for recursively generating a first value based on the input vector, the first value being updated by the first analytic model as one or more transactions are omitted from the plurality of transactions; and a second analytic model generating a weighted reason vector and associated plurality of ranked reasons that provide an understanding of the first value based on a set of top contributor variables in the input vector and latent features of the first analytic model associated with the first value;

wherein one or more transactions involving potentially fraudulent or malicious activity, are identified and omitted from the plurality of transactions associated with the entity data, to enable an early elimination of transactions having fraudulent or malicious nature, responsive to a quantification of a maximal effect on the first value recursively generated based on the input vector.

2. The system of claim 1, wherein the entity data represents the one or more transactions and an output instance comprising a set of one or more values is generated to identify one or more temporal events or transactions most responsible for generating the first value based on the input vector.

3. The system of claim 2, wherein the one or more transactions are selectively and recursively omitted from the plurality of transactions.

4. The system of claim 3, wherein the weighted reason vector provides a set of top contributor variables in the input vector and latent features of the first analytic model that explain the first value.

5. The system of claim 3, wherein responsive to the one or more transactions being selectively and recursively omitted from the plurality of transactions, the maximal effect of the one or more transactions on the first value, the weighted reason vector and the plurality of ranked reasons is determined based on a quantum of change in the first value.

6. The system of claim 5, wherein an importance measure is generated based on the recursive omission.

7. The system of claim 6, wherein the importance measure is a function of a change in the first value and a change in the weighted reason vector.

8. The system of claim 6, wherein the importance measure is used to determine the one or more transactions that have the maximal effect.

9. The system of claim 6, wherein an importance measure is determined based on the recursive omission, the importance measure quantifying an influence of at least one omitted transaction.

10. The system of claim 9, wherein the importance measure is a function of change in the first value and a change in energy associated with at least one of: the weighted reason vector, the plurality of ranked reasons, and a change in a rank associated with the weighted reason vector or the plurality of ranked reasons.

11. The system of claim 1, wherein at least one of the one or more transactions contributes to the one or more temporal events or transactions most responsible for the first value.

12. The system of claim 5, wherein the first analytic model generates a revised first value, and wherein the second analytic model generates the reason vector, and the associated plurality of ranked reasons based on the maximal effect of the omission of at least one of the one or more transactions.

13. The system of claim 6, wherein the importance measure is used for identifying and generating a set of temporal events of past transactions with a maximal importance measure.

14. The system of claim 13, further comprising a translation module for translating at least one set of temporal explanations or reason codes into a human-readable explanation of a reason for the first value.

15. The system of claim 14, wherein the reason codes are associated with at least a transaction or event that had a maximal contribution to at least one of: the first value, the weighted reason vector, and a ranked reason state.

16. The system of claim 14, wherein the output instance provides an output file that includes at least a transaction or event that had a maximal contribution to at least one of: the first value, the weighted reason vector, and a ranked reason state.

17. A computer-implemented method for managing abnormal transactions in a communications network, the method comprising:

collecting, by a first computing system communicatively coupled to the communications network, entity data and determining an input vector based on a plurality of transactions associated with the entity data, wherein the plurality of transactions include one or more abnormal transactions involving potentially fraudulent or malicious activity, and wherein the one or more data storage media devices are communicatively coupled to the communications network, the one or more data storage media devices storing the entity data communicated over the communications network, wherein a first analytic model recursively generates a first value based on the input vector, the first value being updated by the first analytic model as one or more transactions are omitted from the plurality of transactions, wherein a second analytic model generates a weighted reason vector and associated plurality of ranked reasons that provide an understanding of the first value based on a set of top contributor variables in the input vector and latent features of the first analytic model associated with the first value, and wherein one or more transactions involving potentially fraudulent or malicious activity are identified and omitted from the plurality of transactions associated with the entity data to enable an early elimination of transactions having fraudulent or malicious nature, responsive to a quantification of a maximal effect on the first value recursively generated based on the input vector.

18. The method of claim 17, wherein the entity data represents the one or more transactions and an output instance comprising a set of one or more values is generated to identify one or more temporal events or transactions most responsible for generating the first value based on the input vector and wherein the one or more transactions are selectively and recursively omitted from the plurality of transactions.

19. The method of claim 18, wherein the weighted reason vector provides a set of top contributor variables in the input vector and latent features of the first analytic model that explain the first value.

20. The method of claim 18, wherein responsive to the one or more transactions being selectively and recursively omitted from the plurality of transactions, the maximal effect of the one or more transactions on the first value, the weighted reason vector and the plurality of ranked reasons is determined based on a quantum of change in the first value.

21. A computer program product comprising a non-transitory machine-readable medium storing instructions that, when executed by at least one programmable processor, cause the at least one programmable processor to perform operations comprising:

collecting, by a first computing system communicatively coupled to the communications network, entity data and determining an input vector based on a plurality of transactions associated with the entity data, wherein the plurality of transactions include one or more abnormal transactions involving potentially fraudulent or malicious activity, and wherein the one or more data storage media devices are communicatively coupled to the communications network, the one or more data storage media devices storing the entity data communicated over the communications network, wherein a first analytic model recursively generates a first value based on the input vector, the first value being updated by the first analytic model as one or more transactions are omitted from the plurality of transactions, wherein a second analytic model generates a weighted reason vector and associated plurality of ranked reasons that provide an understanding of the first value based on a set of top contributor variables in the input vector and latent features of the first analytic model associated with the first value, and wherein one or more transactions involving potentially fraudulent or malicious activity are identified and omitted from the plurality of transactions associated with the entity data to enable an early elimination of transactions having fraudulent or malicious nature, responsive to a quantification of a maximal effect on the first value recursively generated based on the input vector.

* * * * *